United States Patent
Tabata et al.

(10) Patent No.: US 8,109,742 B2
(45) Date of Patent: Feb. 7, 2012

(54) ROTOR YOKE WITH CUP PORTION HAVING A DEVIATED CENTER OF GRAVITY AND A FLANGE PORTION HAVING A DEVIATED ROTATIONAL AXIS

(75) Inventors: Shinya Tabata, Kyoto (JP); Tadaaki Fujinaga, Kyoto (JP); Yoshitaka Hiraishi, Kyoto (JP); Hideaki Uchise, Kyoto (JP); Takashi Tsukada, Kyoto (JP)

(73) Assignee: Nidec Corporation, Kyoto (JP)

( * ) Notice: Subject to any disclaimer, the term of this patent is extended or adjusted under 35 U.S.C. 154(b) by 368 days.

(21) Appl. No.: 12/468,123

(22) Filed: May 19, 2009

(65) Prior Publication Data

US 2009/0290998 A1 Nov. 26, 2009

(30) Foreign Application Priority Data

May 26, 2008 (JP) ................................. 2008-136258

(51) Int. Cl.
*F04B 35/04* (2006.01)
(52) U.S. Cl. .............. 417/423.1; 417/423.7; 417/423.14
(58) Field of Classification Search .......................... None
See application file for complete search history.

(56) References Cited

U.S. PATENT DOCUMENTS

| 2007/0013239 A1 | 1/2007 | Park |
| 2007/0140844 A1 | 6/2007 | Yoshida |
| 2008/0118379 A1* | 5/2008 | Uchise et al. .............. 417/423.1 |

FOREIGN PATENT DOCUMENTS

| JP | 2002-271069 A | 9/2002 |
| JP | 2002-272069 A | 9/2002 |
| JP | 2007-192217 A | 8/2007 |

OTHER PUBLICATIONS

Machine translation of JP 2002-272069A.*
Hanaoka et al., "Motor, Fan, Rotor Holder and Manufacturing Method of the Same", U.S. Appl. No. 12/145,528, filed Jun. 25, 2008.

* cited by examiner

*Primary Examiner* — Toan Ton
*Assistant Examiner* — Britt D Hanley
(74) *Attorney, Agent, or Firm* — Keating & Bennett, LLP

(57) ABSTRACT

A rotor yoke includes a substantially flat or annular flat cover portion coaxial or substantially coaxial with a rotational axis and a substantially cylindrical side wall portion extending from an outer circumference of the cover portion in a parallel or substantially parallel relationship with the rotational axis. The rotor yoke further includes a substantially annular flange portion extending radially outwards from an open end of the side wall portion. The cover portion and the side wall portion define a cup portion whose center of gravity deviates from the rotational axis in a plane perpendicular or substantially perpendicular to the rotational axis, and the flange portion has an outer circumferential circle whose center deviates from the rotational axis in a direction opposite to the deviation direction of the center of gravity of the cup portion.

7 Claims, 6 Drawing Sheets

FIG. 2A1
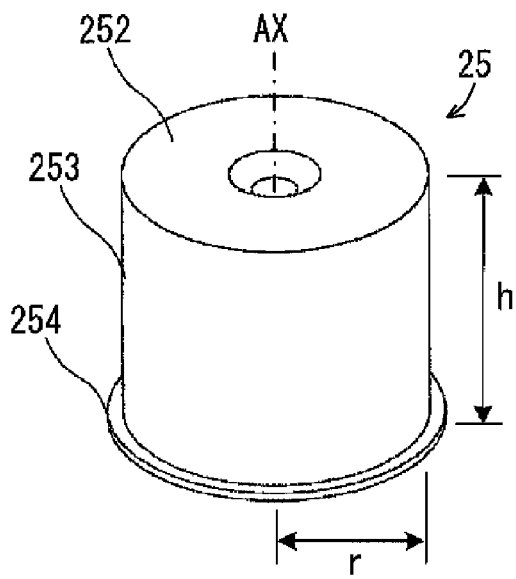
FIG. 2A2
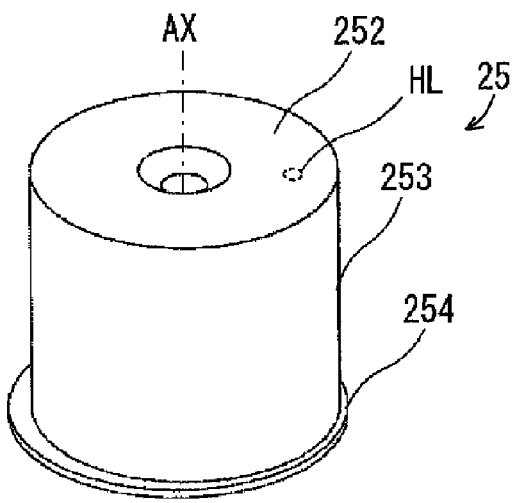
FIG. 2B1
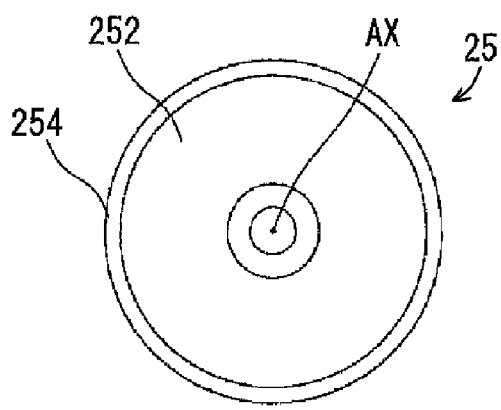
FIG. 2B2
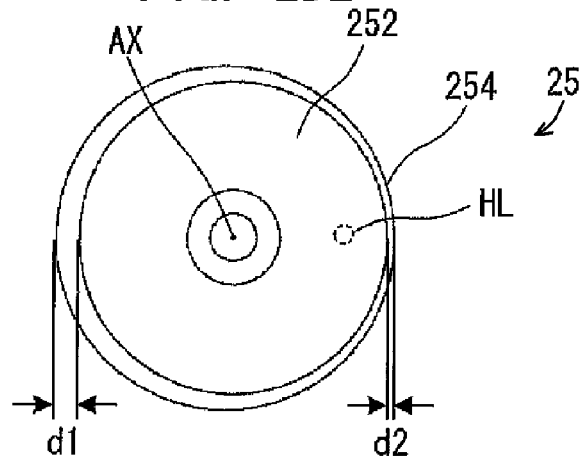
FIG. 2C1
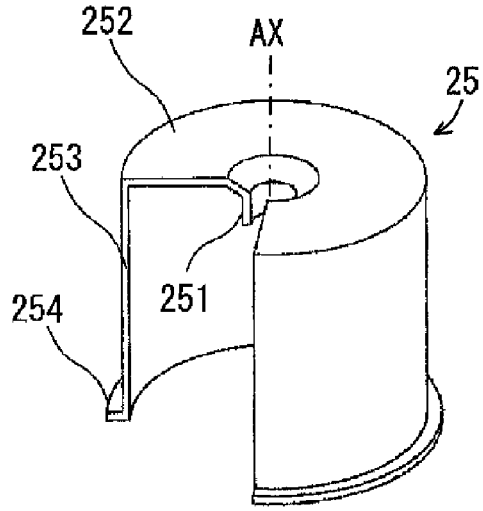
FIG. 2C2
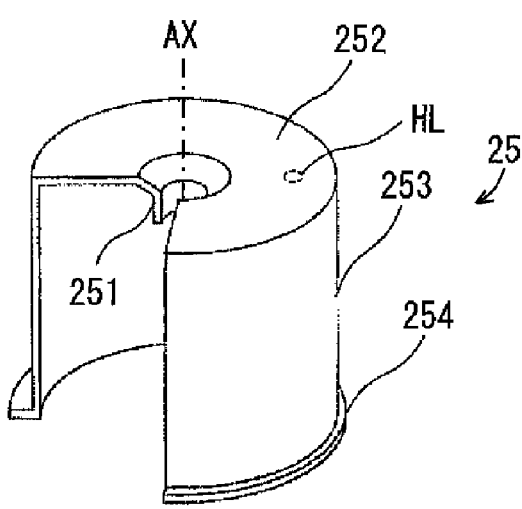

ROTOR YOKE WITH CUP PORTION HAVING A DEVIATED CENTER OF GRAVITY AND A FLANGE PORTION HAVING A DEVIATED ROTATIONAL AXIS

BACKGROUND OF THE INVENTION

1. Field of Invention

The present invention relates to a rotor yoke and a balance adjusting method thereof.

2. Description of the Related Art

A cooling fan is often used to cool electronic devices and heat-generating electronic parts. In order to improve the cooling performance of the cooling fan, it is necessary to increase the flow rate and static pressure of the cooling fan.

In the cooling fan, an impeller needs to be rotated at a high speed in order to assure the increased flow rate and static pressure. However, vibration is generated as the impeller rotates at high speed. This vibration is caused by the imbalance occurring when a rotor united with the impeller rotates. The imbalance is equivalent to the deviation of the center of gravity of the rotor with respect to a rotational axis. The rotor of the cooling fan includes a rotor yoke, a rotor magnet, and a shaft as well as the impeller.

Particularly, because the rotor yoke is made of a metallic material and has a mass greater than that of the impeller made of a resin, the imbalance of the rotor yoke heavily affects the vibration of the impeller. The vibration present during the high-speed rotation of the impeller deteriorates the characteristics of the cooling fan and reduces the life span thereof. Additionally, the vibration may sometimes be a cause of noise, and noise reduction is strongly desired in household electronic devices. For that reason, a demand has existed for a way to adjust the rotational balance of the rotor, particularly the rotational balance of the rotor yoke.

Japanese Patent Laid-open Publication No. 2002-272069 discloses a disk motor for optical disk devices wherein the eccentricity of a rotor assembly and hence the rotational balance thereof are adjusted by providing a notch in a portion of a rim formed around the outer periphery of a lower opening of a rotor yoke.

With the technique disclosed in Japanese Patent Laid-open Publication No. 2002-272069, the rotor yoke is produced and then the rotational balance thereof is measured. Based on the results of the measurement, a notch is provided in a portion of the rim to adjust the rotational balance. However, in this technique, the rotational balance needs to be adjusted on a yoke-by-yoke basis through post-processing, and this creates the problem of non-productivity.

SUMMARY OF THE INVENTION

In order to overcome the problems described above, preferred embodiments of the present invention provide a balance-adjusted rotor yoke that can be produced with increased productivity and a balance adjusting method thereof.

According to a preferred embodiment of the present invention rotor yoke preferably includes a substantially flat or annular flat cover portion coaxial or substantially coaxial with a rotational axis; a substantially cylindrical side wall portion extending from an outer circumference of the cover portion in a parallel or substantially parallel relationship with the rotational axis; and a substantially annular flange portion extending radially outwards from an open end of the side wall portion. The cover portion and the side wall portion define a cup portion whose center of gravity deviates from the rotational axis in a plane perpendicular or substantially perpendicular to the rotational axis, and the flange portion has an outer circumferential circle whose center deviates from the rotational axis in a direction opposite to the deviation direction of the center of gravity of the cup portion.

With the above preferred embodiment of the present invention, the balance of the rotor yoke is adjusted by causing the center of an outer circumferential circle of the flange portion to deviate from a rotational axis in the process of producing the rotor yoke. This eliminates the need to subject the rotor yoke to post-processing, and thus the rotor yoke can have increased productivity.

If a balance adjusting through-hole or notch is defined in the cover portion of the rotor yoke, it becomes possible to easily adjust the axial balance, i.e., the so-called bi-plane balance.

Other features, elements, steps, characteristics and advantages of the present invention will become more apparent from the following detailed description of preferred embodiments of the present invention with reference to the attached drawings.

BRIEF DESCRIPTION OF THE DRAWINGS

FIGS. 2A1 through 2C2 show the shape of the rotor yoke in accordance with a preferred embodiment of the present invention.

DETAILED DESCRIPTION OF THE PREFERRED EMBODIMENTS

Hereinafter, preferred embodiments of the present invention will be described with reference to the accompanying drawings. The schematic configuration of a cooling fan incorporating a rotor yoke in accordance with a preferred embodiment of the present invention will be first described with reference to FIG. 1.

Figure 1:
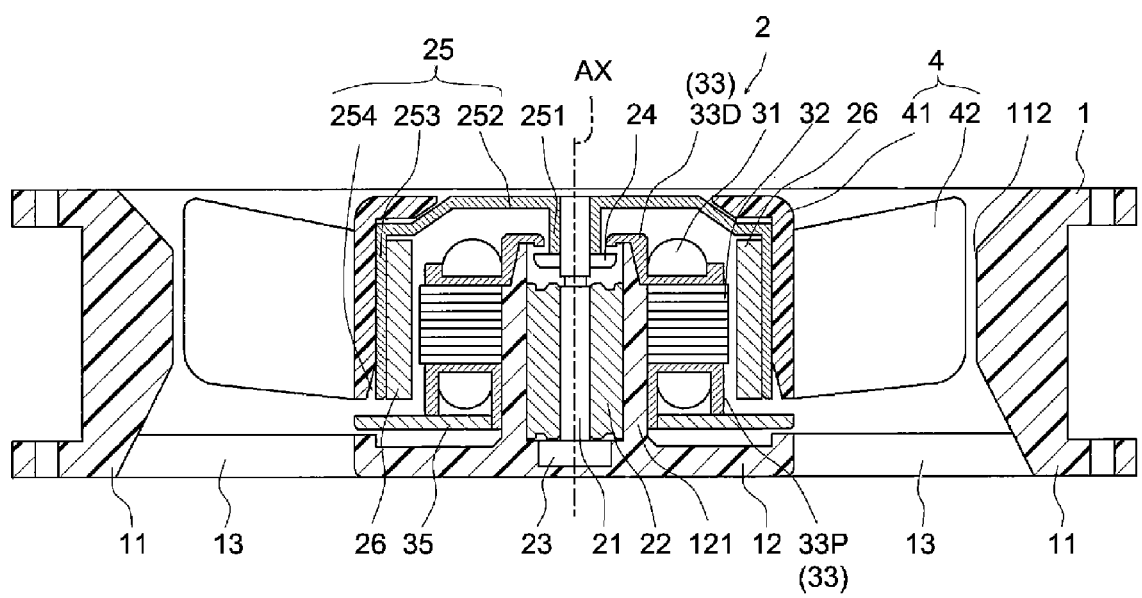
FIG. 1 is a section view showing the schematic configuration of a cooling fan incorporating a rotor yoke in accordance with a preferred embodiment of the present invention.

FIG. 1 shows the schematic configuration of a cooling fan including a rotor yoke in accordance with a preferred embodiment of the present invention, which view is taken along a plane containing a rotational axis AX. The cooling fan preferably includes a housing 1 made from, for example, a resin or plastic (hereinafter simply referred to a resin) material, a motor 2, and an impeller 4. The motor 2 and the impeller 4 are accommodated within the housing 1.

The housing 1 preferably includes a hollow body portion 11, a base portion 12, and a plurality of (e.g., four) connection portions 13. The hollow body portion 11 preferably has a substantially square-shaped contour and a substantially circular-shaped inner circumferential surface 112 when seen in a plan view. The base portion 12 is preferably arranged in the central area of the hollow body portion 11 and has a substantially circular shape when seen in a plan view. The inner circumferential surface 112 of the hollow body portion 11 is a substantially cylindrical surface opposing the outer edge of the impeller 4 with a specified space left therebetween. The inner circumferential surface 112 defines a passage through which air axially blown by the impeller 4 passes.

However, the housing 1 is not limited to a resin-molded product, but may be formed by, e.g., aluminum die casting. The hollow body portion 11, the base portion 12 and the connection portions 13 of the housing 1 are arranged into a single piece by, e.g., resin injection molding or aluminum die casting.

The base portion 12 of the housing 1 is preferably supported at the internal center of the hollow body portion 11 by the connection portions 13. The motor 2 is held in place by the base portion 12. The base portion 12 preferably includes a cylinder portion 121 extending vertically from the central area of the base portion 12 in a coaxial relationship with the rotational axis AX. Mounted to the cylinder portion 121 is a radial bearing 22 arranged to rotatably support a shaft 21 of the motor 2 (and the impeller 4). The radial bearing 22 may be, e.g., a sleeve bearing made of an oil-impregnated sintered alloy, the outer circumferential surface of which is fixed to the inner circumferential surface of the cylinder portion 121.

A thrust plate 23 made of, e.g., metal, ceramic, or resin with superior wear resistance, is embedded in the central area of the base portion 12. The upper surface of the thrust plate 23 opposes the base end surface of the shaft 21, thereby providing a thrust bearing. The side on which the base portion 12 and the connection portions 13 of the housing 1 lie along the rotational axis AX will be referred to as a "base end side", with the opposite side as a "tip end side".

A removal-preventing ring 24 arranged to restrain the shaft 21 from moving axially upwards is fixed to the tip end side of the shaft 21. A rotor yoke 25 preferably produced by, for example, press-forming a magnetic metal plate is fixed to the shaft 21 axially upwards of the removal-preventing ring 24. The rotor yoke 25 preferably includes a shaft-fixing portion 251, a cover portion 252, a side wall portion 253, and a flange portion 254. The shaft-fixing portion 251 is fixed to the tip end side of the shaft 21 and has a substantially cylindrical shape. The cover portion 252 extends radially outwards from the shaft-fixing portion 251 and has a substantially flat shape. The side wall portion 253 extends from the outer circumference of the cover portion 252 toward the base end side in a parallel or substantially parallel relationship with the rotational axis AX and preferably has a substantially cylindrical shape. The flange portion 254 extends radially outwards from the base end of the side wall portion 253 and has a substantially annular shape.

In FIG. 1, the flange portion 254 is depicted on an extremely small scale. In other words, the flange portion 254 is depicted as if it extends radially outwards with an extremely small size.

The impeller 4 is fixed to the outer surface of the rotor yoke 25. The impeller 4 is preferably a resin-molded product. The impeller 4 preferably includes a cup 41 and a plurality of vanes 42. The cup 41 of the impeller 4 covers portions of the side wall portion 253 and the cover portion 252 of the rotor yoke 25. The vanes 42 extend radially outwards from the outer surface of the cup 41 and are arranged side-by-side along the circumferential direction. As the impeller 4 is rotationally driven by the motor 2, an air stream flowing along the rotational axis AX is generated.

In the structural example shown in FIG. 1, the inner circumferential surface on the base end side of the cup 41 is preferably arranged into a tapering shape to create a space for accommodating the flange portion 254 of the rotor yoke 25. As an alternative structural example, the axial dimension of the cup 41 may be shortened so that the base end surface of the cup 41 can be positioned axially upwards of the flange portion 254 of the rotor yoke 25. Even in that case, it is preferred that the outer circumferential surface of the flange portion 254 is positioned radially inwards of the outer circumferential surface of the cup 41. This is to eliminate the possibility that the outer circumferential surface of the flange portion 254 may adversely affect the air stream generated during rotation of the impeller 4.

The outer circumferential surface of a substantially cylindrical rotor magnet 26 is fixedly secured to and held in place by the inner circumferential surface of the side wall portion 253 of the rotor yoke 25. The rotor magnet 26 is magnetized so that plural sets of north and south poles are alternately arranged along the circumferential direction.

The motor 2 preferably includes a stator unit and a rotor unit. The rotor unit preferably includes the rotor magnet 26, the rotor yoke 25, and the shaft 21. The stator unit preferably includes a stator core 32 on which coils 31 are wound and a circuit board 35 to which the terminal ends of the coils 32 are connected. Circuit parts such as a Hall element or a Hall integrated circuit, a motor-driving integrated circuit and the like are preferably mounted to the circuit board 35. The Hall element or the Hall integrated circuit is arranged to detect a change in magnetic flux resulting from rotation of the rotor magnet 26 of the motor 2. Responsive to output signals of the Hall element or the Hall integrated circuit, the motor-driving integrated circuit controls the electric current supplied to the coils 31.

The stator core 32 preferably includes a plurality of pole teeth extending radially outwards from a plurality of circumferential points in a coaxial relationship with the rotational axis AX. The coils 32 are wound on the respective pole teeth. The stator core 32 is preferably formed by laminating a plurality of electromagnetic steel plates one above another in the rotational axis AX. Each of the electromagnetic steel plates is shaped such that the portions defining the pole teeth extend radially outwards from the outer circumference of a doughnut-shaped portion. The doughnut-shaped portions of the electromagnetic steel plates are laminated one above another to form a central cylinder portion of the stator core 32. The central cylinder portion is fitted to the outer circumferential surface of the cylinder portion 121 of the base portion 12. Thus the stator unit including the stator core 32 is fixed to the base portion 12 of the housing 1.

The coils 31 are preferably wound on the stator core 32 through an insulator 33 which is an insulating body made from, for example, resin. The insulator 33 is divided into an axial tip end insulator 33D and an axial base end insulator 33P, both of which are capped on the stator core 32 from opposite axial sides of the stator core 32. The coils 31 are wound on the insulator 33. The outer circumferential surface of each of the pole teeth of the stator core 32 opposes the inner circumferential surface of the rotor magnet 26 with a specified gap left therebetween. The radial outer end surfaces of the electromagnetic steel plates are exposed at the outer circumferential surface of each of the pole teeth.

The axial tip end insulator 33D has a tip end portion extending radially inwards. The inner diameter of a central opening of the axial tip end insulator 33D is smaller than the outer diameter of the removal-preventing ring 24 fixed to the shaft 21. Thus the tip end portion of the insulator 33 serves as a stopper for the removal-preventing ring 24. In other words, the movement of the shaft 21 toward the axial tip end side is restrained by the tip end portion of the insulator 33 and the removal-preventing ring 24.

Next, a description will be made about the shape of the rotor yoke 25 and the balance adjusting method thereof, both of which are features of the preferred embodiments of the present invention. FIGS. 2A1 through 2C2 show the shape of the rotor yoke 25 in accordance with one preferred embodiment of the present invention. FIGS. 2A1 and 2A2 are perspective views of the rotor yoke 25, FIGS. 2B1 and 2B2 are plan views thereof and FIGS. 2C1 and 2C2 are partially notched perspective views of the rotor yoke 25. FIGS. 2A1, 2B1, and 2C1 show a state in which the center of an inner circumferential circle of the flange portion 254 does not deviate from the center of an outer circumferential circle thereof, and FIGS. 2A2, 2B2 and 2C2 show the center of the inner circumferential circle deviating from the center of the outer circumferential circle. FIGS. 2A1 through 2C2 depict the rotor yoke 25 by simplifying the shape of the rotor yoke 25 shown in FIG. 1 and exaggerating the flange portion 254.

The rotor yoke 25 shown in FIGS. 2A1 through 2C2 preferably includes the shaft-fixing portion 251, the cover portion 252, the side wall portion 253, and the flange portion 254. The shaft-fixing portion 251 is, for example, press-fitted to and/or adhesively bonded to the shaft 21 and preferably has a substantially cylindrical shape. The cover portion 252 extends radially outwards from the shaft-fixing portion 251 to have a substantially flat shape. The side wall portion 253 extend axially from the outer circumference of the cover portion 252 toward the base end side. The flange portion 254 extends radially outwards from the base end of the side wall portion 253 and has a substantially annular shape. The rotor yoke 25 of this shape is preferably produced by press-forming a metal plate using a plurality of press molds provided in a plurality of stages. The press-forming includes, e.g., drawing, bending, and shearing. The cover portion 252 and the side wall portion 253 will sometimes be collectively referred to as a cup portion.

The rotor yoke 25 of the present preferred embodiment is characterized in that the center of the outer circumferential circle of the flange portion 254 deviates from the rotational axis AX. This means that the center of the outer circumferential circle of the flange portion 254 deviates from the center of the inner circumferential circle of the flange portion 254, i.e., the center of the outer circumferential circle of the side wall portion 253. In the illustrated example, the center of the outer circumferential circle deviates to the left from the center of the inner circumferential circle. As a result, the difference in radial width of the inner and outer circumferential circles is great (equal to d1 in FIG. 2B2) at the left side but small (equal to d2 in FIG. 2B2) at the right side. This means that the center of gravity of the flange portion 254 deviates to the left from the rotational axis AX.

Figure 3:
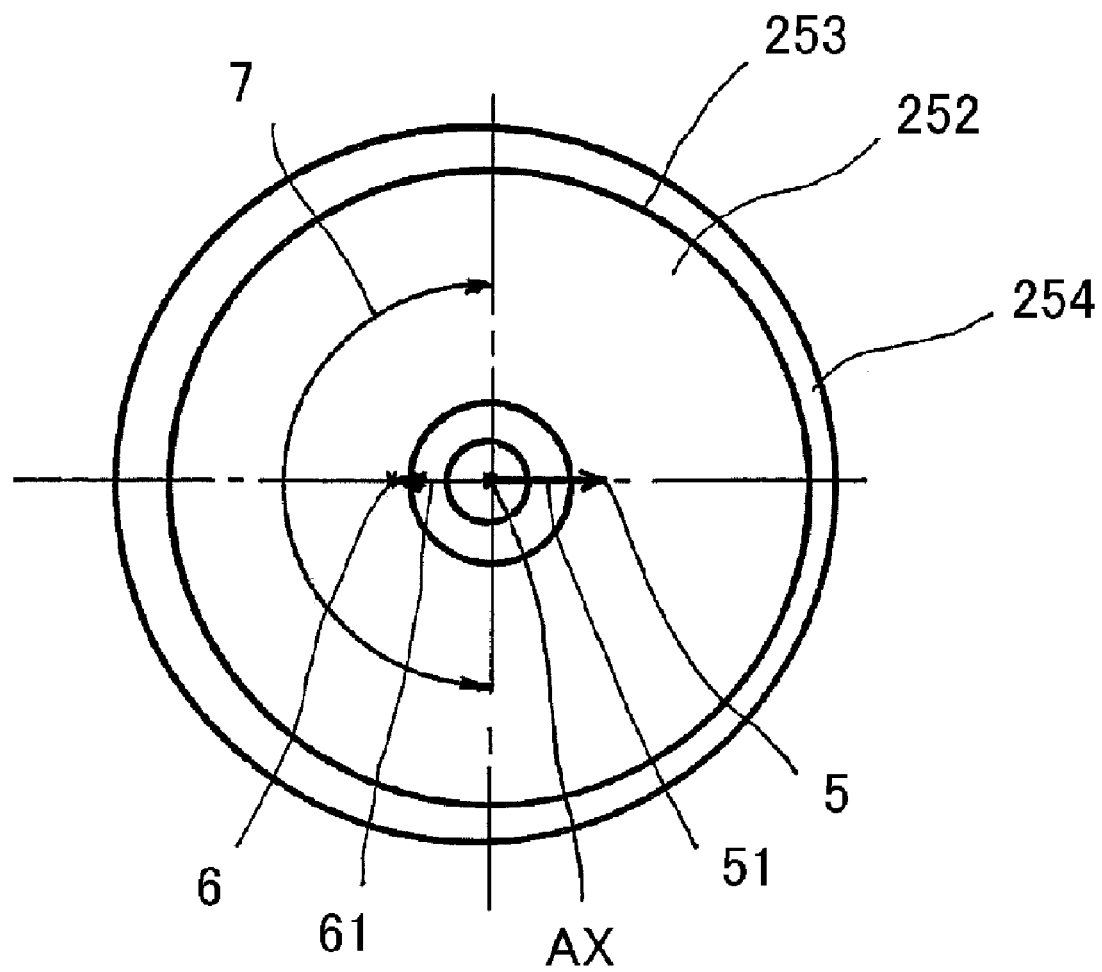
FIG. 3 is a view explaining the relationship between the deviation direction of the center of gravity of the rotor yoke and the deviation direction of the center of an outer circumferential circle of a flange portion.

FIG. 3 is a view explaining the relationship between the deviation direction of the center of gravity of the rotor yoke and the deviation direction of the center of the outer circumferential circle of the flange portion. FIG. 3 illustrates the deviation of the center of gravity of the cup portion including the cover portion 252 and the side wall portion 253 and the deviation direction of the outer circumferential circle of the flange portion 254. In FIG. 3, the deviation of the center of gravity 5 of the cup portion and the deviation of center 6 of the outer circumferential circle of the flange portion are illustrated on an enlarged scale for the sake of increased understanding.

Referring to FIG. 3, various angles used herein are measured counterclockwise from the deviation direction 51 of the center of gravity 5 of the cup portion which is equal to zero degrees.

Reference numeral "5" in FIG. 3 designates the center of gravity of the cup portion. It is preferred that the center 6 of the outer circumferential circle of the flange portion 254 deviates toward the opposite side from the deviation direction 51 of the center of gravity 5 of the cup portion with respect to the rotational axis AX. In this regard, the opposite side from the deviation direction 51 of the center of gravity 5 of the cup portion means the angular range of from about 90 degrees to about 270 degrees as indicated by an arrow 7. The center of gravity of the flange portion 254 is deviated from the rotational axis AX by causing the center 6 of the outer circumferential circle of the flange portion 254 to deviate from the rotational axis AX. In case the deviation direction 51 of the center of gravity of the cup portion makes an angle of less than 90 degrees relative to the deviation direction 61 of the center of the outer circumferential circle of the flange portion 254, it becomes difficult to perform a desired balance adjustment.

The reason for deviating the center of gravity of the flange portion 254 from the rotational axis AX in this manner is to adjust the rotational balance of the rotor yoke 25, thereby suppressing the vibration which would otherwise be caused by the rotation of the rotor yoke 25. In other words, the deviation of the center of gravity of the cup portion including the cover portion 252 and the side wall portion 253 is offset by moving the center of gravity of the flange portion 254, consequently adjusting the balance of the rotor yoke 25 as a whole.

The rotor yoke 25 is preferably produced by subjecting a metal plate to press working including multi-stage continuous drawing, bending, and shearing, for example. In general, a progressive press machine is used in producing the rotor yoke 25 and a coiled material (or a steel plate) is used as the metal plate. The progressive press machine refers to a press machine that processes a workpiece through a plurality of stages, e.g., drawing, bending, and shearing. A plurality of press molds is used in the press machine. It is necessary to correct the press mold used in the final stage, i.e., the shearing stage. This makes it possible to deviate the center of the outer circumferential circle of the flange portion 254 from the center of the inner circumferential circle thereof, namely to deviate the center of gravity of the flange portion 254 from the rotational axis AX.

As will be described below, the deviation direction and deviation amount of the center of the outer circumferential circle relative to the center of the inner circumferential circle of the flange portion 254 may be determined by measuring a prototype rotor yoke 25 with a balance measuring instrument. Referring to FIG. 2B2, the difference between the inner and outer circumferential circles of the flange portion 254, i.e., the difference (d1−d2) between the maximum value (d1) and the minimum value (d2) of the radial width is equivalent to the deviation amount. For effective balance adjustment, it is preferred that the deviation amount is equal to or greater than about 0.1 mm.

Figure 4:
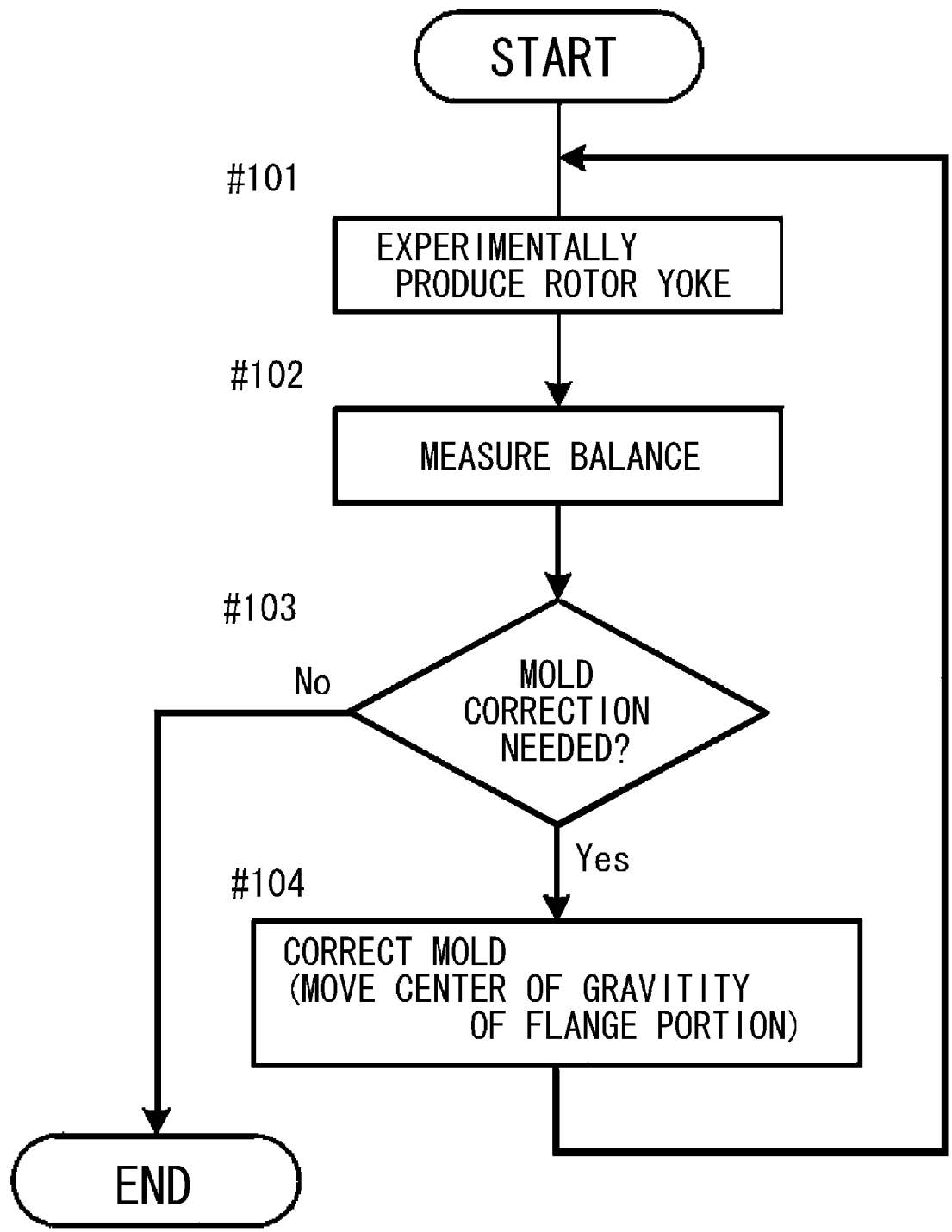
FIG. 4 is a flowchart illustrating an exemplary sequence of a balance adjusting method employed in a production process of the rotor yoke in accordance with a preferred embodiment of the present invention.

Hereinafter, an exemplary sequence of a balance adjusting method employed in the production process of the rotor yoke 25 will be described with reference to FIG. 4. FIG. 4 is a flowchart illustrating an exemplary sequence of a balance adjusting method employed in a production process of the rotor yoke in accordance with one preferred embodiment of the present invention.

First, the rotor yoke 25 is experimentally produced from a coiled material by the press machine mentioned above (step

101). At this time, the shaft-fixing portion 251, the cover portion 252, the side wall portion 253, and the flange portion 254 of the rotor yoke 25 are formed by, for example, subjecting the coiled material to piercing (formation of a center hole), multi-stage drawing, and bending. Thereafter, the flange portion 254 is severed from the flange portion 254 by the final shearing, thus producing the rotor yoke 25. In other words, the outer circumferential circle of the flange portion 254 becomes definite. In the case of the rotor yoke 25 being experimentally produced first, the center of the inner circumferential circle of the flange portion 254 does not deviate from the center of the outer circumferential circle thereof as is the case in the rotor yoke 25 illustrated in FIGS. 2A1, 2B1 and 2C1.

Next, the resultant prototype rotor yoke 25 is placed on a balance measuring instrument to measure the deviation of the center of gravity of the rotor yoke 25 from the rotational axis AX which may appear during rotation of the rotor yoke 25 (step #102). For example, if a circumferential thickness variation exists in the side wall portion 253 of the press-formed rotor yoke 25, the center of gravity of the rotor yoke 25 deviates from the rotational axis AX. When the rotor yoke 25 is rotated, this deviation generates a centrifugal force at the center of gravity of the rotor yoke 25, which may cause vibration to the rotor yoke 25.

The balance measuring instrument can measure the relationship between the acceleration and phase attributable to the centrifugal force by, for example, using an acceleration sensor or the like. The magnitude of acceleration is equivalent to the deviation amount of the center of gravity of the rotor yoke 25, while the phase is equivalent to the deviation direction of the center of gravity. If the phase (degrees) is indicated on a horizontal axis with the output voltage of the acceleration sensor on a vertical axis, the output voltage of the acceleration sensor describes a sinusoidal wave-like curve repeatedly descending and rising between a maximum value and a minimum value in a cycle of 360 degrees. The configuration of the balance measuring instrument is well-known in the art (see, e.g., Japanese Patent Laid-open Publication No. 2002-271069) and therefore will not be described in detail.

Based on the measurement results in the balance measuring instrument, determination is made as to whether the press mold needs to be corrected or not (step #103). More specifically, if the output voltage of the acceleration sensor equivalent to the deviation amount of the center of gravity falls within a specified permissible range in all phases (if the answer of step #103 is No), the balance adjustment is terminated without having to correct the press mold. In contrast, if the output voltage of the acceleration sensor falls outside the specified permissible range in any phase (if the answer of step #103 is Yes), the flow proceeds to step #104 to correct the press mold.

Among the press molds used in a plurality of stages of the press machine, the press mold used in the final shearing stage is corrected in step #104. More specifically, based on the measurement results in the balance measuring instrument, the press mold is corrected to ensure that the center of the outer circumferential circle of the flange portion 254 deviates from the center of the inner circumferential circle thereof in the phase (or direction) shifted about 180 degrees with respect to the phase equivalent to the deviation direction of the center of gravity of the rotor yoke 25. It is ideal to make the deviation in the 180 degrees shifted phase (or direction). The balance adjustment may possibly be performed if the deviation is made in the phase ranging from about 90 degrees to about 270 degrees. The phase in which the deviation is made may be preferably in the range of from about 120 degrees to about 240 degrees and more preferably in the range of from about 150 degrees to about 210 degrees.

In this manner, the deviation of the center of gravity of the cup portion including the cover portion 252 and the side wall portion 253 is offset by moving the center of gravity of the flange portion 254, consequently adjusting the balance of the rotor yoke 25 as a whole.

In case the deviation is made in the about 180 degrees shifted direction, the deviation amount of the center of the outer circumferential circle of the flange portion 254 from the center of the inner circumferential circle thereof can be calculated from the maximum value of the output voltage of the acceleration sensor equivalent to the deviation amount of the center of gravity. In case the deviation is made in the direction ranging from about 90 degrees to about 270 degrees, the deviation amount can be calculated from the output voltage of the acceleration sensor in that deviated direction.

Next, the rotor yoke 25 is experimentally produced once again by using the press mold thus corrected. In other words, the flow returns to step #101. In step #102, the balance is measured by the balance measuring instrument. If the measurement results reveal that there is a need to correct the press mold in a different way (if the answer of step #103 is Yes), the press mold is corrected once again in step #104. Step #101 through step #104 are repeated until the output voltage of the acceleration sensor equivalent to the deviation amount of the center of gravity measured in step #102 falls within the specified permissible range in all phases.

The afore-mentioned balance adjusting method employed in the production process of the rotor yoke 25 is often referred to as "single-plane balance adjustment". This balance adjusting method is particularly effective in adjusting the balance of a relatively flat rotor yoke, i.e., a rotor yoke whose side wall portion has a short axial length.

If the length (h) of the side wall portion 253 is greater than the radius (r) thereof as is the case in the rotor yoke 25 shown in FIG. 2A1, it is sometimes required to adjust the axial balance (the balance along the rotational axis AX) as well as the radial balance. In other words, the axial balance cannot be adjusted by merely causing the center of gravity of the flange portion 254 to deviate from the rotational axis AX. On the contrary, the axial balance may sometimes be destroyed if the center of gravity of the flange portion 254 is caused to deviate.

In combination with the balance adjustment that causes deviation of the center of gravity of the cover portion 252, the axial balance is adjusted by, e.g., arranging a balance adjusting through-hole ("HL" in FIGS. 2A2, 2B2 and 2C2) in the cover portion 252. In this way, the axial balance as well as the radial balance is adjusted by moving the centers of gravity in two mutually spaced-apart planes perpendicular or substantially perpendicular to the axial direction, e.g., in the planes of the flange portion 254 and the cover portion 252. This is called "bi-plane balance adjustment".

Next, an exemplary sequence of the bi-plane balance adjustment employed in the production process of the rotor yoke 25 will be described with reference to FIG. 5. Description will be made by placing an emphasis on the points differing from the exemplary sequence of the single-plane balance adjustment illustrated in FIG. 4.

In step #201, the rotor yoke 25 is first experimentally produced from a coiled material in the same manner as in the single-plane balance adjustment. In the case of the rotor yoke 25 being experimentally produced first, the center of the inner circumferential circle of the flange portion 254 does not deviate from the center of the outer circumferential circle thereof as is the case in the rotor yoke 25 illustrated in FIGS. 2A1, 2B1 and 2C1. Furthermore, the balance adjusting through-hole HL is not formed in the cover portion 252.

In step #202, the balance is measured by the balance measuring instrument in the same manner as in the single-plane balance adjustment. In step #203, the balance adjustment direction and the balance adjustment amount are determined from the balance measuring results. As mentioned earlier, the phase shifted about 180 degrees from the phase in which the output voltage of the acceleration sensor becomes greatest is determined to be the balance adjustment direction. The maximum value of the output voltage of the acceleration sensor is determined to be the balance adjustment amount.

At this time, the balance adjustment direction and the balance adjustment amount in the bi-plane balance adjustment are determined so as to move the center of gravity of the cover portion 252 as well as the center of gravity of the flange portion 254, thereby preventing destruction of the axial balance. In other words, the balance adjustment amount is apportioned to the movement amount of the center of gravity of the flange portion 254 and the movement amount of the center of gravity of the cover portion 252.

If it is determined in step #204 that the press mold needs to be corrected in order to perform the afore-mentioned balance adjustment, the press mold is corrected in step #205. As is the case in the single-plane balance adjustment, the press mold used in the final shearing stage is corrected to move the center of gravity of the flange portion 254. That is to say, the press mold is corrected to ensure that the center of the outer circumferential circle of the flange portion 254 deviates from the center of the inner circumferential circle thereof in the balance adjustment direction noted above.

In order to move the center of gravity of the cover portion 252, a piercing press mold is corrected so that it can form the balance adjusting through-hole HL in the cover portion 252. The balance adjusting through-hole HL is formed in the direction shifted about 180 degrees from the balance adjustment direction (or the moving direction of center of gravity).

After the press molds have been corrected in preparation for the bi-plane balance adjustment, the flow returns to step #201 where the rotor yoke 25 is experimentally produced once again. In step #202, the balance is re-measured by the balance measuring instrument. If it is determined that the press molds need to be corrected in a different way, the press molds are corrected once again in step #204. Step #201 through step #205 are repeated until the output voltage of the acceleration sensor equivalent to the deviation amount of the center of gravity measured in step #202 falls within a specified permissible range in all phases.

In the bi-plane balance adjustment described above, the press molds are corrected to move the centers of gravity in the plane of the flange portion 254 and in the plane of the cover portion 252. Instead of arranging the balance adjusting through-hole HL in the cover portion 252, the press molds may be corrected by changing the thickness of the side wall portion 253 or by arranging a through-hole in the side wall portion 253. This makes it possible to move the center of gravity in a plane (perpendicular to the rotational axis AX) other than the plane of the cover portion 252.

In case both the single-plane balance adjustment and the bi-plane balance adjustment are hard to adjust the balance of the rotor yoke 25 by merely moving the center of gravity of the flange portion 254, it may be possible to use other balance adjusting methods in combination therewith. Examples of other balance adjusting methods include changing the thickness of the side wall portion 253, arranging a through-hole in the side wall portion 253, or arranging a balance adjusting through-hole or notch in the flange portion 254.

A preferred embodiment of the present invention may apply to a rotor yoke 25B that does not include the shaft-fixing portion 251. The schematic configuration of a cooling fan incorporating such a rotor yoke 25B is shown in FIG. 6.

Figure 6:
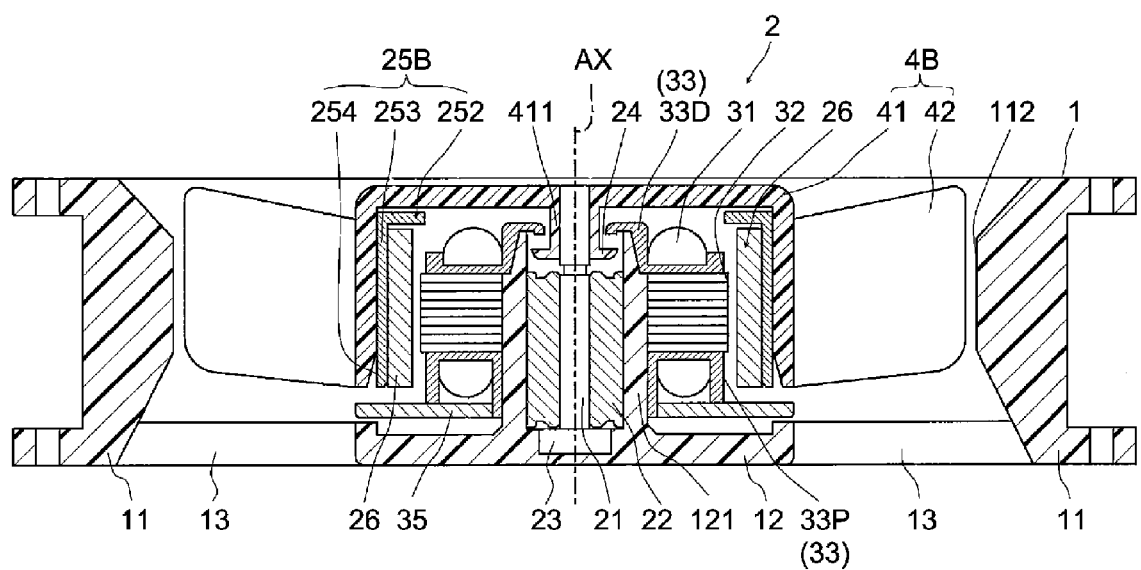
FIG. 6 is a sectional view showing the schematic configuration of a cooling fan incorporating a rotor yoke in accordance with another preferred embodiment of the present invention.

FIG. 6 is a sectional view showing the schematic configuration of a cooling fan incorporating a rotor yoke in accordance with another preferred embodiment of the present invention, which view is taken along a plane containing the rotational axis AX.

The rotor yoke 25B of this cooling fan preferably includes a cover portion 252, a side wall portion 253, and a flange portion 254. The cover portion 252 has a substantially annular flat shape coaxial with the rotational axis AX. The side wall portion 253 extends from the outer circumference of the cover portion 252 toward the base end side in a parallel or substantially parallel relationship with the rotational axis AX and has a substantially cylindrical shape. The flange portion 254 extends radially outwards from the base end of the side wall portion 253 and has a substantially annular shape.

The rotor yoke 25B differs from the rotor yoke 25 of the preceding preferred embodiment in that the cylindrical shaft-fixing portion 251 arranged on the shaft 21 is absent, as a result of which the cover portion 252 has a substantially annular flat shape and not a substantially disk shape.

Therefore, the rotor yoke 25B is not directly fixed to the shaft 21 but fixed thereto through an impeller 4B. In other words, the impeller 4B includes an impeller cup 41 having a radially inwardly extending cylindrical shaft-fixing portion 411 fixed to the shaft 21. A removal-preventing ring 24 is arranged with the base end portion of the shaft-fixing portion 411 as a single unit. The rotor yoke 25B is fixed to the inner surface of the impeller cup 41 by, for example, press-fitting, bonding or other fixing device. The remaining structures are the same as the corresponding structures of the cooling fan described above in respect of the preceding preferred embodiment.

A preferred embodiment of the present invention may apply to the cooling fan incorporating this type of rotor yoke 25B (and impeller 4B). For bi-plane balance adjustment purposes, the center of gravity of the flange portion 254 is moved and, in addition, a notch may be defined in the cover portion 252 instead of defining the balance adjusting through-hole HL. In other words, a balance adjusting notch shifted about 180 degrees from the balance adjustment direction (or the center moving direction) may be formed in the inner circumferential edge of the substantially annular flat cover portion 252.

Figure 5:
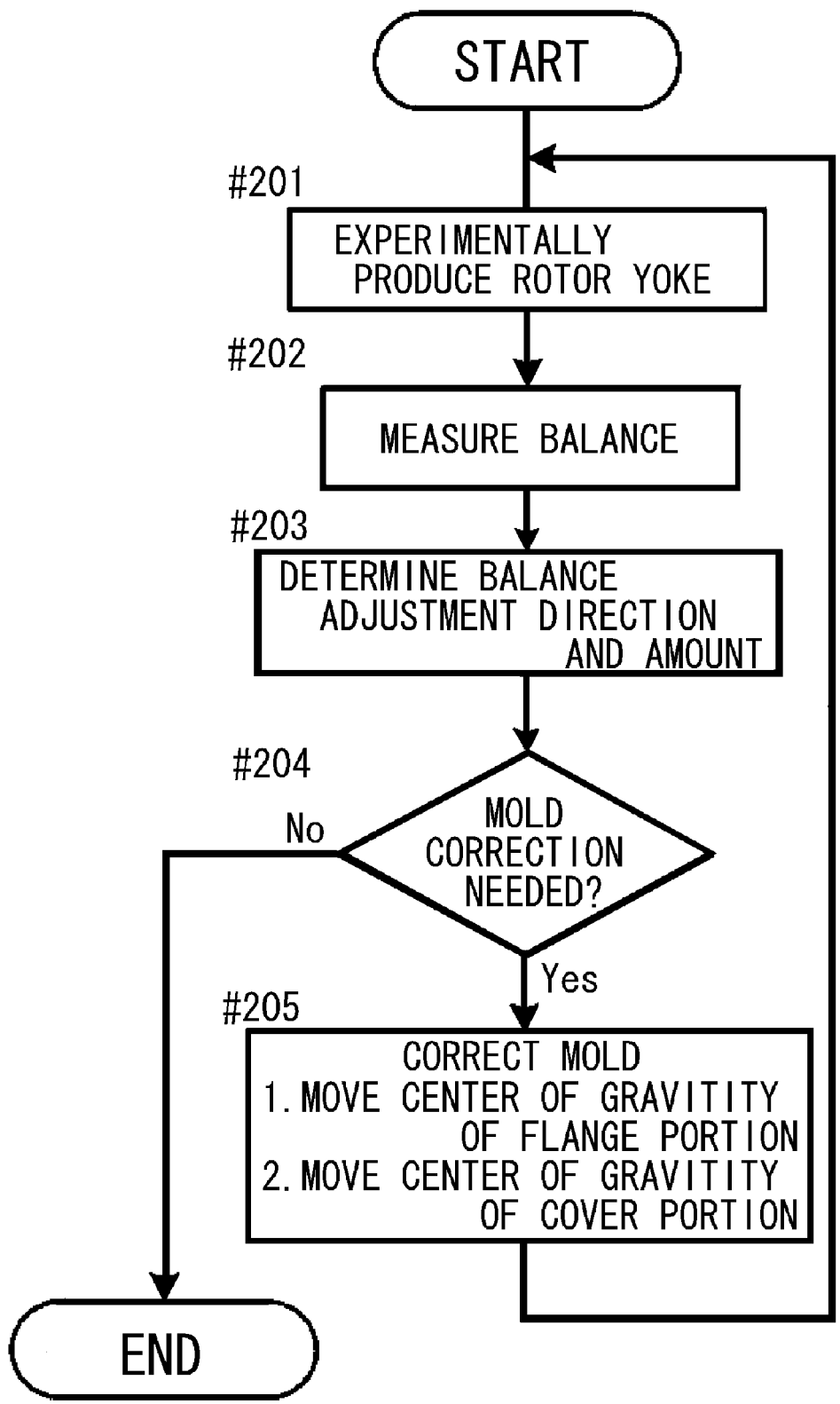
FIG. 5 is a flowchart illustrating an exemplary sequence of a bi-plane balance adjusting method employed in the production process of the rotor yoke.

A jig for fixing the rotor yoke 25B to a rotation shaft and rotating the same is required in the balance measurement performed in step #102 shown in FIG. 4 or in step #202 shown in FIG. 5. It is preferred that the jig has a shape as close as possible to the shape of the impeller cup 41 excluding the vanes 42 of the impeller 4B. Due consideration should be given to ensure that the center of gravity deviation of the impeller cup 41 itself or other factors has minimized influence on the measurement of imbalance of the rotor yoke 25B.

Various preferred embodiments of the present invention provide a fan unit characterized by including the rotor yoke described above, an impeller fixedly secured to the rotor yoke, and a motor arranged to rotate the rotor yoke and the impeller, wherein the impeller includes an impeller cup fixedly secured to an outer circumferential surface of the rotor yoke and a plurality of vanes extending radially outwards from the impeller cup and arranged side-by-side along a circumferential direction, and the flange portion of the rotor yoke has an outer circumference positioned radially inwards of an outer circumferential surface of the impeller cup.

As described above, the balance of the rotor yoke is adjusted by causing the center of gravity of the flange portion to deviate from the rotational axis using the press molds arranged to shape the rotor yoke. In the rotor yoke of this configuration, the outer circumference of the flange portion is not constant in position. For that reason, it may be the case that the outer circumference of the flange portion is positioned radially outwards of the outer circumferential surface of the impeller cup. If such is the case, there is a concern that the outer circumference of the flange portion hinders the flow of an air stream. To avoid occurrence of such a situation, various preferred embodiments of the present invention ensure that the outer circumference of the flange portion of the rotor yoke is positioned radially inwards of the outer circumferential surface of the impeller cup. This eliminates the possibility that the outer circumference of the flange portion hinders the flow of the air stream generated by the impeller.

The rotor yoke in accordance with preferred embodiments of the present invention is preferably used in various kinds of fans, particularly in a cooling fan.

While preferred embodiments of the present invention have been described above, it is to be understood that variations and modifications will be apparent to those skilled in the art without departing the scope and spirit of the present invention. The scope of the present invention, therefore, is to be determined solely by the following claims.

What is claimed is:

1. A rotor yoke comprising:
   a substantially flat cover portion arranged to be substantially coaxial with a rotational axis;
   a substantially cylindrical side wall portion extending from an outer circumference of the cover portion in a parallel or substantially parallel relationship with the rotational axis; and
   a substantially annular flange portion extending radially outwards from an open end of the side wall portion; wherein
   the cover portion and the side wall portion define a cup portion whose center of gravity deviates in a deviation direction from the rotational axis in a plane perpendicular or substantially perpendicular to the rotational axis; and
   the flange portion includes a continuously extending outer circumference defined by a substantially uniform circle whose center deviates from the rotational axis in a direction opposite to the deviation direction of the center of gravity of the cup portion such that some portions of the flange portion extend farther away from the rotational axis than other portions of the flange portion.

2. The rotor yoke of claim 1, wherein the flange portion has a maximum width value and a minimum width value, and the difference between the maximum width value and the minimum width value is equal to or greater than about 0.1 mm.

3. The rotor yoke of claim 1, wherein the deviation direction of the center of gravity of the cup portion defines an angle of about 120 degrees to about 240 degrees around the rotational axis with respect to the deviation direction of the center of the outer circumferential circle of the flange portion.

4. The rotor yoke of claim 1, wherein a length of the side wall portion along the rotational axis is greater than a radius of an outer circumferential circle of the side wall portion.

5. The rotor yoke of claim 1, wherein the cover portion includes at least one balance adjusting through-hole or balance adjusting notch.

6. The rotor yoke of claim 1, wherein the flange portion includes at least one balance adjusting through-hole or balance adjusting notch.

7. A fan unit comprising:
   the rotor yoke of claim 1;
   an impeller fixedly secured to the rotor yoke; and
   a motor arranged to rotate the rotor yoke and the impeller; wherein
   the impeller includes an impeller cup fixedly secured to an outer circumferential surface of the rotor yoke and a plurality of vanes extending radially outwards from the impeller cup and arranged side-by-side along a circumferential direction, and the flange portion of the rotor yoke has an outer circumference positioned radially inwards of an outer circumferential surface of the impeller cup.

* * * * *